United States Patent [19]

Lee et al.

[11] Patent Number: 4,711,928

[45] Date of Patent: Dec. 8, 1987

[54] MOISTURE CURED ONE-PART RTV SILICONE SEALANT

[75] Inventors: Chi-long Lee; Myron T. Maxson, both of Midland, Mich.

[73] Assignee: Dow Corning Corporation, Midland, Mich.

[21] Appl. No.: 835,578

[22] Filed: Mar. 3, 1986

[51] Int. Cl.$^4$ .............................................. C08L 83/04
[52] U.S. Cl. ........................................ 524/860; 528/17; 528/33; 528/34; 528/15; 528/31; 528/32
[58] Field of Search ..................... 528/17, 15, 33, 31, 528/34, 32, 35, 902; 524/860

[56] References Cited

U.S. PATENT DOCUMENTS

| | | | |
|---|---|---|---|
| 3,122,522 | 2/1964 | Brown et al. | 260/46.5 |
| 3,175,993 | 3/1965 | Weyenberg | 260/46.5 |
| 3,334,067 | 9/1967 | Weyenberg | 260/46.5 |
| 3,383,355 | 5/1968 | Cooper | 260/46.5 |
| 3,542,901 | 11/1970 | Cooper et al. | 260/825 |
| 3,856,839 | 12/1974 | Smith et al. | 260/429.5 |
| 4,599,394 | 7/1986 | Lucas | 528/32 |

FOREIGN PATENT DOCUMENTS 110251 6/1984 European Pat. Off. .
123935 11/1984 European Pat. Off. .

*Primary Examiner*—Melvyn I. Marquis
*Attorney, Agent, or Firm*—Edward C. Elliott

[57] ABSTRACT

A method of producing a one-part silicone elastomeric sealant which has improved shelf life and an economical process of manufacture is disclosed. The method mixes a diorganovinylsiloxy endblocked polydiorganosiloxane, reinforcing filler, and a silazane. This reinforced base is then converted by reacting with a silane of the formula

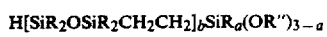

$$H[SiR_2OSiR_2CH_2CH_2]_bSiR_a(OR'')_{3-a}$$

where R is methyl, ethyl, propyl, phenyl or trifluoropropyl, R" is methyl or ethyl, a is 0 or 1, and b is 0 or 1 using a platinum catalyst. The result is a base containing an alkoxy functional polymer. This base is then mixed with alkoxy functional silane crosslinker and titanium catalyst to yield a composition which is stable in the absence of moisture for long periods of time in storage, but cures to an elastomer upon exposure to moisture. The improved shelf life is due to the presence of alkylene radicals between the penultimate silicon atom and the last silicon atom of the polymer.

8 Claims, No Drawings

MOISTURE CURED ONE-PART RTV SILICONE SEALANT

BACKGROUND OF THE INVENTION

1. Field of the Invention

This invention relates to a method of producing a one-part silicone reinforced sealant which is stable in the absence of moisture, but cures to an elastomer upon exposure to moisture.

2. Background Information

A method of economically producing a reinforced one-part silicone sealant which was stable in the absence of moisture, but cured to an elastomer in the presence of moisture was desired. Experience with the type of sealant based upon hydroxyl or alkoxy functional polydiorganosiloxane, alkoxy functional crosslinker, and titanate catalyst revealed that such sealants suffered in that as they shelf aged, they gradually lost the ability to cure upon exposure to moisture.

A method was developed to make a sealant composition which had the desired physical properties when cured and which had improved storage stability upon storage in the absence of moisture.

Although there was no known published art which suggested how to solve the problem of loss of cure upon storage of this type of silicone sealant, once the cause of the problem was discovered other prior art became of interest.

U.S. Pat. No. 3,122,522, issued Feb. 25, 1964 to Brown and Hyde discloses a siloxane composition, each molecule of which consists essentially of (1) at least two units of the formula

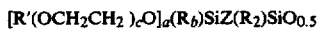

and units of the formula

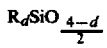

where each a has a value ranging from 2 to 3, each b has a value ranging from 0 to 1, the sum of a and b in any unit (1) is no greater than 3, each c has a value ranging from 1 to 2, each d has a value ranging from 0 to 2, and Z is a divalent hydrocarbon radical of from 2 to 18 inclusive carbon atoms, Z being free of aliphatic unsaturation. Each molecule of the silicone composition has an average of from 1.3 to 2 R groups per silicon atom and there are at least 7 units of

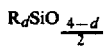

per molecule.

U.S. Pat. No. 3,175,993, issued March 30, 1965 to Weyenberg discloses a composition consisting essentially of the average formula

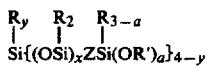

in which each R is free of aliphatic unsaturation, Z is a divalent hydrocarbon radical free of aliphatic unsaturation, y has a value of from 0 to 2 inclusive, x has a value of at least 3, and a has an average value from 2 to 3 inclusive.

Both of the above references teach preparation of the siloxane by reacting siloxanes containing —SiH groups with the appropriate silane containing a monovalent hydrocarbon radical containing an aliphatic or cycloaliphatic group in the presence of a platinum catalyst through the reaction of the —SiH and aliphatic C═C group. This reaction produces the divalent Z radical. Alternatively, the C═C group can be on the siloxane and the —SiH can be on the silane.

European Patent Application 123 935 A, published Nov. 7, 1984 by Toten and Pines, discloses an alkoxysilyl functional silicone including at least one functional group of the formula

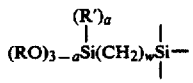

where w is an integer of from 2 to about 20, useful as capable of imparting satisfactory lubricity and other properties such as softness to a variety of textile fabrics.

European Patent Application 0110251, published June 6, 1984, discloses a process for producing alkoxy-terminated polysiloxanes useful to produce room temperature vulcanizing silicone rubber compositions. The process anhydrously reacts a silanol or vinyl siloxane with a polyalkoxy crosslinking agent which is an alkoxy silane in the presence of a platinum catalyst. This alkoxy-terminated polysiloxane can also be mixed with treated filler and condensation catalyst. This application teaches that an alkoxy-terminated polysiloxane having no silethylene linkage at the polymer terminal silicon is equivalent to a polydiorganosiloxane that does contain a trialkoxysilethylene terminal group.

There are many patents directed to the system of producing silicone sealants based upon the use of alkoxy functional polymers, alkoxy functional crosslinkers, and titanate catalysts. Representative of these is U.S. Pat. No. 3,334,067, issued Aug. 1, 1967, to Weyenberg. Weyenberg discloses a method of making one component room temperature curing siloxane rubber. His compositions are stable in the absence of moisture, but cure upon exposure to moisture. The method comprises mixing in the absence of moisture a hydroxyl endblocked siloxane polymer, a silane of the formula R'Si(OR")$_3$ and a beta-dicarbonyl titanium compound.

In U.S. Pat. No. 3,383,355, issued May 14, 1968, Cooper discloses polymers having alkoxy groups bonded to terminal silicon atoms by reacting a hydroxylated organosiloxane polymer with an alkoxy silane in the presence of a suitable catalyst. He discloses that such functional diorganopolysiloxanes having from two to three alkoxy radicals attached to each terminal silicon atom are curable in the presence of moisture and a suitable hydrolysis and condensation catalyst to a rubbery material.

Smith et al., in U.S. Pat. No. 3,856,839, issued Dec. 24, 1974, disclose alkanedioxy titanium chelates which catalyze the cure of a composition which also contains methyltrimethoxysilane and a silanol chain-stopped polydiorganosiloxane fluid. The particular chelated titanium compound is stated to be desirable because it does not cause thickening during the manufacture of the composition as does the previously known titanium compounds.

None of the disclosures in this background information is of any assistance in solving the problem of how to improve the shelf life of silicone sealants that lose the ability to cure upon long time storage in the absence of moisture, said sealants being catalyzed with titanium compounds.

SUMMARY OF THE INVENTION

This invention is a process for producing a one-part silicone sealant which is stable in the absence of moisture which contains an in situ treated reinforcing filler. A diorganovinylsiloxy endblocked polydiorganosiloxane is combined with reinforcing silica filler and silazane treating agent and heated to yield a reinforced base. The base is then combined with a silane of the formula

in the presence of a platinum catalyst to give a alkoxysilethylene ended polymer, which is then combined with an alkoxy functional silane crosslinker and a titanium catalyst, all mixing being without exposure to moisture, to yield the sealant which is curable on exposure to moisture.

DESCRIPTION OF THE INVENTION

This invention relates to a method of producing a one-part silicone sealant stable in the absence of moisture which cures on exposure to moisture having an in situ treated filler comprising a method of producing a one-part silicone sealant stable in the absence of moisture which cures on exposure to moisture having an in situ treated filler comprising (A) mixing (1) 100 parts by weight of a diorganovinylsiloxy endblocked polydiorganosiloxane where the viscosity of the siloxane is from 0.5 to 500 Pa.s at 25° C., (2) from 5 to 100 parts by weight of a reinforcing filler having a surface area of from about 50 to 400 m$^2$/g, and (3) from 0.5 to 4.0 parts by weight of a silazane of the formula (RR'''MeSi)$_2$NH, where R is methyl, ethyl, propyl, phenyl, or trifluoropropyl, R''' is methyl or vinyl and where, if vinyl is present, the ratio of methyl to vinyl is from 1:1 to 50:1, for each 10 parts of filler (2), (B) heating the mixture to a temperature of 175° C. with a nitrogen purge over the container to treat the filler, (C) cooling, then adding (4) sufficient silane of the formula H[SiR$_2$OSiR$_2$CH$_2$CH$_2$]$_b$SiR$_a$(OR'')$_{3-a}$ where R is methyl, ethyl, propyl, phenyl or trifluoropropyl, R'' is methyl or ethyl, a is 0 or 1, and b is 0 or 1, to give a ratio of 1 to 3 mols of silane per mol of vinyl radical in polydiorganosiloxane (1), (5) from 1 to 50 parts by weight of platinum per million parts by weight of polydiorganosiloxane (1) as platinum catalyst, then heating for from 30 to 60 minutes at a temperature of from 65° C. to 125° C., then (D) applying a vacuum and cooling to room temperature, then (E) admixing in the absence of moisture, (6) from 3 to 15 parts by weight of a crosslinker of the formula
TI R'$_a$Si(OR'')$_{4-a}$ where R' is methyl or phenyl, R'' is methyl or ethyl, and a is 0 or 1, and (7) from 0.2 to 2.0 parts by weight of a titanium catalyst, and (F) storing the mixture in the absence of moisture.

The method of this invention is designed to produce, in the most economical manner, a high strength silicone sealant that is stable in the absence of moisture for long periods of time, but which cures rapidly when exposed to moisture. A reinforcing filler is treated in situ to provide the potential high strength, then the reinforced polymer is modified to change the ends of the polymer to a more stable form so that the final sealant has a long storage life.

The diorganovinylsiloxy endblocked polydiorganosiloxane (1) is of the formula

where R is methyl, ethyl, propyl, phenyl, or trifluoropropyl. The value of x is such that the viscosity of the polymer is from 0.5 to 500 Pa.s at 25° C. These polymers are known materials which are manufactured by hydrolysis of the appropriate diorganocyclosiloxanes in the presence of a hydrolysis catalyst such as potassium hydroxide and an endblocking material such as divinyltetramethyldisiloxane.

The reinforcing filler (2) can be any of the commonly used fillers for silicone sealants such as fume silica, precipitated silica, and diatomacious earth, as long as they have a surface area of from 50 to 400 m$^2$/g so that they serve to reinforce the composition.

Ingredient (3) is used to treat the surface of the reinforcing filler (2) so that the sealant does not crepe upon aging. The silazane is of the formula (RR'''MeSi)$_2$NH where R is methyl, ethyl, propyl, phenyl, or trifluoropropyl, R''' is methyl or vinyl, and where, if vinyl is present, the ratio of methyl to vinyl is from 1:1 to 50:1. If a portion of the R''' radicals are vinyl radicals, the treated, reinforcing filler surface will also react with the silane (4) at the time of converting the polymer (1) in step (C). The resulting sealant will then have a higher durometer and modulus as the amount of crosslinking will be higher in the cured sealant. A preferred silazane is hexamethyldisilazane. These silazane treating agents are well known is the art.

The preferred amount of silazane (3) is from 0.5 to 4.0 parts by weight per 10 parts by weight of filler (2). The optimum amount of silazane (3) depends to some extent upon the surface area of the filler (2) to be treated. Higher surface area fillers need more of the silazane (3). Larger amounts can be used, but are not necessary.

The polymer (1) is converted to a polymer in which the end silica atoms are joined by carbon atoms rather than by oxygen by reacting the reinforced polymer with silane (4) of the formula

where R is methyl, ethyl, propyl, phenyl or trifluoropropyl, R'' is methyl or ethyl, a is 0 or 1, and b is 0 or 1. Sufficient silane (4) is used to give a ratio of 1 to 3 mols of silane per mol of vinyl radical in polydiorganosiloxane (1). When b is 0 and a is 0, the silane is of the formula HSi(OR'')$_3$; when b is 0 and a is 1, the silane is of the formula HSiR'(OR'')$_2$; when b is 1 and a is 0, the silane is of the formula HSiR$_2$OSiR$_2$CH$_2$CH$_2$Si(OR'')$_3$;

when b is 1 and a is 1, the silane is of the formula $HSiR_2OSiR_2CH_2CH_2SiR(OR'')_2$.

When a vinyl endblocked polydiorganosiloxane (1) is reacted with a silane having b equal to 0 and a is 0, a polymer of the formula

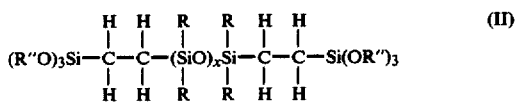

is formed and when b is 1 and a is 0, a siloxane of the formula

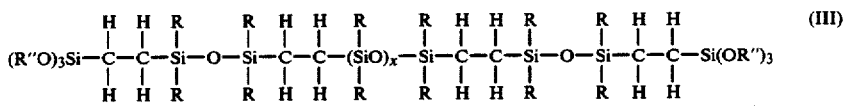

is formed. When a is 1, similar polymers are formed except the end group has the form $-SiR(OR'')_2$ where R is an organic radical selected from methyl, ethyl, propyl, phenyl, and trifluoropropyl, and R" is methyl or ethyl, with methyl being most preferred. The radicals can be the same or combinations of the above where at least 50 mol percent of the radicals are methyl radicals.

The polymer of the formula (II) may be produced by reacting the appropriate vinyl endblocked siloxane with the appropriate silane in the presence of a platinum catalyst such as chloroplatinic acid at a temperature of from 30° to 150° C. Methods of making these polymers are taught in U.S. Pat. No. 3,175,993, issued March 30, 1965, to Weyenberg, which is hereby incorporated by reference to show methods of manufacturing polymer of formula (II).

The polymer of formula (III) is manufactured by reacting a vinyl endblocked polydiorganosiloxane with an endcapping composition of the formula

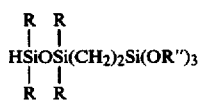

where R and R" are as defined above, using a platinum catalyst to cause the materials to react. R" is preferrably methyl radical. This endcapping composition is prepared by reacting $ViSi(OR'')_3$ with $(R_2HSi)_2O$ in the presence of a platinum catalyst where only one end of the disilane is reacted. This can be done by combining 1 mol of the $ViSi(OR'')_3$ with greater than 2 mols of the disiloxane. When this mixture is combined with a platinum catalyst, there is a slightly exothermic reaction after a few minutes at room temperature. The color changes from clear to light yellow. A by-product will be present consisting of product produced by the reaction of $ViSi(OR'')_3$ to both ends of the silane. This by-product can be left in the material. At a 1 to 2 ratio, there is about 15 percent by-product produced. If the ratio is changed to 1 to 4, the by-product drops to about 5 percent. The excess silane is then stripped from the product.

The preferred silane (4) is that in which b is 1 and in which a is 0. The ethylene link between the penultimate silicon atom and the end silicon atom of the polymer, as in polymer III above, is thought to account for the improved shelf life of the resulting sealant. It is also thought that the presence of two such groups at the end of the polymer further improves the shelf life.

Ingredient (5) is a platinum catalyst of the type useful in the hydrosilation reaction. Examples include platinum catalyst selected from those known to be useful in the hydrosilation reaction. The platinum catalyst can range from platinum as deposited on carriers such as silica gel or charcoal, to platinic acid, salts of platinum, chloroplatinic acid, and compounds of platinum such as those described in U.S. Pat. Nos. 3,419,593, 3,814,730, 3,923,705, 4,288,345, and 4,421,903 all of which are hereby incorporated by reference to show suitable platinum catalysts and their methods of manufacture.

Ingredient (6) is a silane crosslinker of the formula $$R'_a Si(OR'')_{4-a}$$

where R' is methyl or phenyl, R" is methyl or ethyl, and a is 0 or 1. When a is 0 or 1, the silane acts to crosslink the sealant. From 3 to 15 parts by weight of the silane having a either 1 or 2 or a mixture are needed to crosslink the sealant. In addition, silane in which a is 2 can be added to adjust the modulus of the sealant; the more of the chain extender that is added, the lower the modulus and durometer. A methoxy endblocked polymer of the formula $$MeO(SiMe_2O)_k SiMe_2 OMe,$$

where Me is methyl, and k is from 1 to 10, is also useful as a chain extruder. Up to about 10 parts by weight of the chain extender are thought to be useful with about 5 parts being preferred. The preferred crosslinker is methyltrimethoxysilane. The preferred chain extender is methylphenyldimethoxysilane.

Ingredient (7) is a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, and bis-(acetylacetonyl)-diisopropyltitanate.

This invention is an improved method of producing a one-part silicone sealant which is very stable in the absence of moisture, but cures rapidly when exposed to moisture. The method is a very economical means of producing such a sealant. The method uses materials which are produced in commercial quantities except for the silane (4). The method uses a procedure which yields a surface treated filler in situ to further lower the cost of production. The polydiorganosiloxane polymer is converted during the method from a vinyl endblocked one to a methoxy ended one which has the last two silicon atoms separated by an alkylene radical. This alkylene radical between the end silicon atoms produces a sealant which is more shelf stable than one in which the alkylene linkage is not present.

The first step in the method is (A) mixing of ingredients (1), (2), and (3) in a heavy duty mixer which is capable of being heated and cooled and of being sealed from the atmosphere with an inert gas purge or a vacuum being allied to the mixed contents. Such mixers are those commonly used in the preparation of silicone elastomers. A preferred procedure adds about one half of the polymer to the mixer, admixes the silazane, (3), then adds the reinforcing filler (2) in increments, mixing each increment into the polymer thoroughly before adding the next increment. The mixer is then heated to accelerate the reaction between the filler surface and the silazane treating agent. A vacuum is applied to the mixer contents to remove any moisture or other volatile material and then the remainder of the polymer is admixed.

The polymer, containing the surface-treated filler, is then converted from a vinyl endblocked polymer to an alkoxy endblocked polymer by adding silane (4) and platinum catalyst to catalyze the hydrosilation reaction between the vinyl group on the polymer and the hydrogen atom on the silane. This reaction is preferably done at a temperature of from 65° C. to 125° C. for from 30 to 60 minutes. The reaction can be carried out at lower temperatures, but more time then must be allowed for the reaction to go to completion. The preferred silanes are those in which a is 0 as the resulting trialkoxysilyl endblocked polymer is more reactive than the alkyldialkoxy endblocked polymer obtained when a is 1. It is also preferred that the silane be one in which b is 1 because that silane has a lower vapor pressure and is less likely to be lost in the conversion reaction. It is also felt that the silane in which b is 1 is capable of giving a more shelf stable sealant. When b is 0, a is 0, and R" is methyl, the silane, trimethoxysilane, has a boiling point of about 84° C., so the reaction must be carried out at a low temperature or under pressure. If carried out at low temperature a longer period of time is necessary in order to reach completion.

After the polymer is converted, any volatile products are removed by subjecting the mixer contents to a vacuum. The mixer is then cooled without allowing any moisture to come in contact with the contents. The mixer contents are then converted into a sealant curable on exposure to moisture by adding crosslinker (6) and titanium catalyst (7) and mixing to uniformity. The preferred crosslinker is methyltrimethoxysilane because it is cheapest and most readily available. It is necessary to add about 6 parts of the crosslinker if it is desired to obtain a sealant having shelf life in the storage tube as the crosslinker acts as a scavanger and reacts with any moisture or hydroxyl radicals which may be present in the mixture at the time the crosslinker is added or which may get into the tube during the storage period. Theoretically, it is not necessary to have any crosslinker present to cause a crosslinking of the converted polymer (1) because it now has functional ends, but for practical products the crosslinker (6) has been found necessary. If a lower modulus sealant is desired, a silane (6) having a equal to 2 can also be admixed at this time. The titanate catalyst is added to accelerate the reaction between the alkoxy functional radicals and the moisture present during curing to produce the crosslinked sealant. The useful range of titanium catalyst is from 0.2 to 2.0 parts by weight. If less catalyst is used, the sealant will take longer to cure, if more is used, the sealant will cure faster. More than 2.0 parts by weight of catalyst can be used, but it serves no useful purpose.

The method of this invention yields a composition produced by the method of claim 1, consisting essentially of (11) 100 parts by weight of a polydiorganosiloxane of the formula

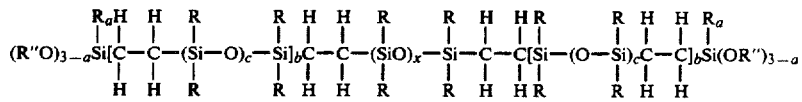

where R is methyl, ethyl, propyl, phenyl, or trifluoropropyl, R" is methyl or ethyl, a is 0 or 1, b is 0 or 1, c is from 1 to 6 and x is such that the viscosity is from 8 to 500 Pa.s at 25° C., (12) from 5 to 100 parts by weight of a surface-treated reinforcing filler having a surface area of from about 50 to 400 m²/g, (13) from 3 to 15 parts by weight of a crosslinker of the formula

where R' and R" are as defined above, (14) from 0 to 15 parts by weight of a chain extender selected from the formula

where Ph is phenyl, Me is methyl, and k is from 1 to 10, and (15) from 0.2 to 2.0 parts by weight of a titanium catalyst.

The polydiorganosiloxane (11) is the result of the conversion of the polymer (1) by the silane (4) in the method of the invention as in claim 1. The reinforcing filler (2) has a treated surface because of the in situ treatment of filler by the silazane (3). The method uses a platinum catalyst (5) which is present in the composition covered by claim 4.

A similar conversion of polydiorganosiloxane polymer which is endblocked with dialkylhydrogensiloxy radicals can be accomplished by converting with a material similar to silane (4) in which the hydrogen atom is replaced by an allyl group, preferably vinyl. In other words, the reactive groups are the same, they are just reversed in their location in the respective reactants. The result would still be polydiorganosiloxane (11).

The sealant produced by the method of this invention, the composition of claim 4, is useful in filling cracks and voids. The consistency of the composition before curing can be adjusted by choice of the polymer (1) viscosity and the choice of amount and type of filler (2) to yield a paste material which can be easily extruded from the storage container, for instance a common sealant tube. The moisture in the air will then convert the paste to an elastomer through reaction of the polymer ends, crosslinker, and catalyst.

The method and composition of this invention can also contain the common ingredients found in silicone sealants such as extending fillers and pigments. Extending fillers include such as ground quartz and finely ground calcium carbonate. Pigments include such as titanium dioxide, iron oxide, and carbon black. Because platinum is already present in the composition, the addition of carbon black gives a sealant with enhanced flame retardancy.

The following examples disclose preferred embodiments of the present invention and should not be interpreted as limiting the scope of the invention which is properly delineated in the accompanying claims. All parts and percentages are by weight unless otherwise indicated.

EXAMPLE 1

A 1 qt. sigma blade heavy duty mixer was loaded with 150 g of dimethylvinylsiloxy endblocked polydimethylsiloxane having a viscosity of about 10 Pa.s at 25° C. and 6 g of water and mixed 5 minutes. Then 24 g of hexamethyldisilazane treating agent was added and mixed for 5 minutes, at which time 40 g of fume silica having a surface area of about 250 m$^2$/g was mixed in over a 15 minute period, then another 40 g of the filler were added and mixed in. The mixer was then heated to 175° C. and vacuum applied to the mixing chamber for 1 hour. Then 250 g of the polydimethylsiloxane was added and mixed at temperature and vacuum for one hour, at which time the mixer was cooled to 125° C. and 55 drops of chloroplatinic acid complex of divinyltetramethyldisiloxane diluted with dimethylvinylsiloxy endblocked polydimethylsiloxane to provide 0.7 weight percent platinum was added and mixed in for 5 minutes. The reinforced polymer was then converted by adding 14.34 g of HSiMe$_2$OMe$_2$SiCH$_2$CH$_2$Si(OMe)$_3$ and mixing at 125° C. for 45 minutes, then applying vacuum while mixing for an additional 30 minutes, then cooling under vacuum for 30 minutes to yield a reinforced polymer having the following structure

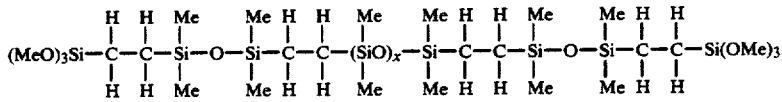

where x was about 520. The viscosity of the polymer was about 10 Pa.s at 25° C.

This base was then converted to a sealant by mixing into 140 g portions of the base the amounts of methyltrimethoxysilane crosslinker and tetrabutyltitanate catalyst shown in Table I. This mixing was done in the absence of moisture and the mixtures were placed in storage tubes which were sealed to keep out moisture.

After 1 week storage, samples of the sealants were extruded from the tubes and formed into test sheets, which were allowed to cure on exposure to the atmosphere for one week at room temperature. Test pieces were then cut from the cured sheets and tested with the results shown in Table I. The durometer was tested according to ASTM D2240, tensile strength and elongation according to ASTM D412, and tear strength, die B according to ASTM D624.

TABLE I

| | | | |
|---|---|---|---|
| MTM, g | 6.3 | 8.5 | 10.6 |
| TBT, g | .6 | .6 | .6 |
| Durometer | 47 | 42 | 44 |
| Tensile Strength, MPa | 6.6 | 5.9 | 5.7 |
| Elongation, % | 369 | 369 | 358 |
| Tear Strength, kN/m | 18.4 | 23.1 | 19.1 |

MTM, methyltrimethoxysilane
TBT, tetrabutyltitanate

EXAMPLE 2

A series of similar bases were prepared, except a dimethylvinylsiloxy endblocked polydimethylsiloxane having a viscosity of about 30 Pa.s at 25° C. was used in conjunction with the amounts of ingredients shown in Table II. The bases were then formulated as above using the amounts of ingredients shown in Table II. The phenylmethyldimethoxysilane is added as a chain extender to increase the elongation of the finished sealant. The resultant sealants were packaged, stored and tested as in Example 1 with the results shown in Table II.

TABLE II

| | | | |
|---|---|---|---|
| polymer | 100 | 100 | 100 |
| filler | 20 | 25 | 25 |
| treating agent | 4 | 5 | 5 |
| water | 1.05 | 1.25 | 1.25 |
| catalyst | 0.2 | 0.2 | 0.2 |
| HSiMe$_2$OMe$_2$Si—CH$_2$CH$_2$Si(OMe)$_3$ | 1.17 | 2.34 | 2.34 |
| Above base formulated into sealant | | | |
| Base | 100 | 100 | 100 |
| MTM | 5.7 | 5.7 | 5.7 |
| TBT | 0.46 | 0.46 | 0.46 |
| PhMeSi(OMe)$_2$ | 5.7 | — | 5.7 |
| Properties of sealant | | | |
| Durometer | 26 | 45 | 32 |
| Tensile Strength, MPa | 5.7 | 7.5 | 5.2 |
| Elongation, % | 945 | 546 | 725 |
| Tear Strength, kN/m | 19.2 | 20.3 | 24.3 |

EXAMPLE 3

Another series was prepared as in Example 2 except part of the polymer was replaced with a polymer having a viscosity of about 0.4 Pa.s at 2520 C. as shown in Table III. The resultant sealant was tested as above.

TABLE III

| | | | |
|---|---|---|---|
| High Visc. Polymer | 100 | 90 | 85 |
| Low Visc. Polymer | — | 10 | 15 |
| filler | 25 | 25 | 25 |
| treating agent | 5 | 5 | 5 |
| water | 1.25 | 1.3 | 1.3 |
| catalyst | 0.2 | 0.2 | 0.2 |
| HSiMe$_2$OMe$_2$Si—CH$_2$CH$_2$Si(OMe)$_3$ | 2.34 | 3.49 | 2.03 |
| Above base formulated into sealant | | | |
| Base | 100 | 100 | 100 |
| MTM | 5.7 | 5.7 | 5.7 |
| TBT | 0.46 | 0.46 | 0.46 |
| PhMeSi(OMe)$_2$ | 5.7 | 5.7 | 5.7 |
| Properties of sealant | | | |
| Durometer | 32 | 45 | 40 |
| Tensile Strength, MPa | 5.2 | 8.1 | 5.8 |
| Elongation, % | 725 | 600 | 616 |
| Tear Strength, kN/m | 24.3 | 27.3 | 22.4 |

EXAMPLE 4

A series of compositions were prepared using different ratios of polydioorganosilocane (1) to silane (4).

Each composition was prepared by mixing 100 g of polymer (1), 30 g of filler, 6 g of treating agent, and 1.5 g of water and preparing a base as in Example 1, then adding 14 drops of platinum catalyst and the amount of the silane (4) shown in Table IV and converting the polymer as in Example 1. Each composition was then mixed with 8.0 g of methyltrimethoxysilane and 0.64 g of tetrabutyltitanate and stored and tested as in Example 1. The results are shown in Table IV, showing that at least 0.75 mol of SiH from the silane (4) must be present for each mol of vinyl radical in the polymer (1).

TABLE VI

| Silane g | SiH/Vi | Durometer | Tensile Strength MPa | Elongation % | Tear Strength kN/m |
|---|---|---|---|---|---|
| 4.78 | 2/1 | 42 | 5.9 | 369 | 23.1 |
| 2.39 | 1/1 | 46 | 6.3 | 372 | 21.9 |
| 1.79 | .75/1 | 48 | 6.2 | 390 | 20.5 |
| 1.20 | .5/1 | 34 | 2.1 | 279 | 2.8 |

EXAMPLE 5

The effect of the amount of crosslinker was evaluated. A base was prepared as is Example 4 using 3.59 parts by weight of siloxane to convert the polymer. The base was mixed with the amount of methyltrimethoxysilane shown in Table V and 0.6 part by weight of the platinum catalyst. The resulting sealant was then aged and tested as in Example 4 with the results shown in Table V.

TABLE V

| Amount of MTM parts | Durometer | Tensile Strength psi | Tensile Strength MPa | Elongation % | Tear Strength ppi | Tear Strength kN/m |
|---|---|---|---|---|---|---|
| 4 | | | cured in tube | | | |
| 6 | 46 | 961 | 6.6 | 369 | 105 | 18.4 |
| 8 | 42 | 858 | 5.9 | 369 | 132 | 23.1 |
| 10 | 44 | 825 | 5.7 | 358 | 109 | 19.1 |

That which is claimed is:

1. A method of producing a one-part silicone sealant stable in the absence of moisture which cures on exposure to moisture having an in situ treated filler comprising
    (A) mixing
        (1) 100 parts by weight of a diorganovinylsiloxy endblocked polydiorganosiloxane where the viscosity of the siloxane is from 0.5 to 500 Pa.s at 25° C.,
        (2) from 5 to 100 parts by weight of a reinforcing filler having a surface area of from about 50 to 400 m$^2$/g, and
        (3) from 0.5 to 4.0 parts by weight of a silazane of the formula $(RR'''MeSi)_2NH$, where R is methyl, ethyl, propyl, phenyl, or trifluoropropyl, R''' is methyl or vinyl, and where, if vinyl is present, the ratio of methyl to vinyl is from 1:1 to 50:1, for each 10 parts of filler (2),
    (B) heating the mixture to a temperature of 175° C., with a nitrogen purge over the container to treat the filler,
    (C) cooling, then adding
        (4) sufficient silane of the formula $H[SiR_2OSiR_2CH_2CH_2]_bSiR_a(OR'')_{3-a}$ where R is methyl, ethyl, propyl, phenyl or trifluoropropyl, R'' is methyl or ethyl, a is 0 or 1, and b is 0 or 1, to give a ratio of 1 to 3 mols of silane per mol of vinyl radical in polydiorganosiloxane (1),
        (5) from 1 to 50 parts by weight of platinum per million parts by weight of polydiorganosiloxane (1) as platinum catalyst, then heating for from 30 to 60 minutes at a temperature of from 65° C. to 125° C., then
    (D) applying a vacuum and cooling to room temperature, then
    (E) admixing in the absence of moisture,
        (6) from 3 to 15 parts by weight of a crosslinker of the formula $R'_aSi(OR'')_{4-a}$ where R' is methyl or phenyl, R'' is methyl or ethyl, and a is 0 or 1 and
        (7) from 0.2 to 2.0 parts by weight of a titanium catalyst, and
    (F) storing the mixture in the absence of moisture.

2. The method of claim 1 in which the silane of (4) is $HMe_2SiOSi(Me_2)CH_2CH_2Si(OMe)_3$.

3. The method of claim 1 in which there is also added at step (E),
    (8) from 0 to 15 parts by weight of $PhMeSi(OMe)_2$ or
    $MeO(SiMe_2O)_kSiMe_2OMe$
    where Ph is phenyl, Me is methyl, and k is from 1 to 10.

4. The method of claim 1 in which there is is also added at step (E),
    (9) carbon black.

5. A one-part silicone sealant produced by the process of claim 1.

6. A one-part silicone sealant produced by the process of claim 2.

7. A one-part silicone sealant produced by the process of claim 3.

8. A one-part silicone sealant produced by the process of claim 4.

* * * * *

UNITED STATES PATENT AND TRADEMARK OFFICE
CERTIFICATE OF CORRECTION

PATENT NO.  : 4,711,928

DATED       : December 8, 1987

INVENTOR(S) : Chi-Long Lee and Myron Timothy Maxson

It is certified that error appears in the above-identified patent and that said Letters Patent is hereby corrected as shown below:

Column 3, line 65, remove "TI". Should be $R'_a Si(OR'')_{4-a}$

Signed and Sealed this

Fourteenth Day of June, 1988

Attest:

DONALD J. QUIGG

Attesting Officer

Commissioner of Patents and Trademarks